US012569920B2

(12) United States Patent
Strassburger

(10) Patent No.: US 12,569,920 B2
(45) Date of Patent: Mar. 10, 2026

(54) DOWNFORCE INDICATOR DEVICE HAVING A TOOL RECEPTACLE

(71) Applicant: Robert Bosch GmbH, Stuttgart (DE)

(72) Inventor: Erwin Strassburger, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/779,227

(22) Filed: Jul. 22, 2024

(65) Prior Publication Data

US 2025/0033125 A1     Jan. 30, 2025

(30) Foreign Application Priority Data

Jul. 25, 2023     (DE) ..................... 10 2023 207 076.6

(51) Int. Cl.
B23B 49/00          (2006.01)
B23Q 17/09          (2006.01)

(52) U.S. Cl.
CPC .......... B23B 49/00 (2013.01); B23Q 17/0952 (2013.01)

(58) Field of Classification Search
CPC ........ B23B 2260/088; B23B 2270/483; B23B 49/00; B23Q 17/0952
See application file for complete search history.

(56) References Cited

U.S. PATENT DOCUMENTS 2,231,864 A * 2/1941 Abel ..................... B23B 49/008
                                                    408/112
3,627,437 A * 12/1971 Smith ................... B23B 49/001
                                                    340/600
4,090,802 A * 5/1978 Bilz ..................... B23B 49/001
                                                    408/11
(Continued)

FOREIGN PATENT DOCUMENTS

CN        218865324 U * 4/2023
DE    102011080374 A1 * 2/2013 ......... B23Q 17/0966
(Continued)

OTHER PUBLICATIONS

CN-218865324-U Machine Translation (Year: 2023).*
(Continued)

*Primary Examiner* — Michael W Hotchkiss
(74) *Attorney, Agent, or Firm* — Maginot, Moore & Beck LLP

(57)          ABSTRACT

A downforce indicator device for indicating a downforce acting on an insertion tool includes a tool receptacle for receiving an insertion tool, a downforce measurement unit for measuring a downforce acting on the tool receptacle, and a downforce indicator unit for indicating the measured downforce. The downforce measuring unit includes a first and a second sleeve, coaxially and displaceably disposed on the first sleeve in the axial direction. The first sleeve is connected to the second sleeve by a limiting element which can be displaced axially on the first sleeve to establish a (Continued)

Fig. 4 maximum position of the second sleeve for an axial displacement of the second sleeve directed away from the first sleeve. The first sleeve and the second sleeve form a common receptacle for receiving a spring element acting on the second sleeve in the direction towards the maximum position. The maximum position is associated with a minimum downforce.

12 Claims, 3 Drawing Sheets

(56) References Cited

U.S. PATENT DOCUMENTS

| 4,198,180 | A | * | 4/1980 | Schultz | B23Q 5/06 |
| | | | | | 408/12 |
| 4,521,145 | A | * | 6/1985 | Bieler | B23B 51/0081 |
| | | | | | 408/202 |
| 5,351,039 | A | * | 9/1994 | Oketani | B23Q 11/04 |
| | | | | | 408/6 |
| 6,665,948 | B1 | * | 12/2003 | Kozin | A61B 90/06 |
| | | | | | 175/45 |
| 8,925,169 | B2 | * | 1/2015 | Schevers | B23B 49/00 |
| | | | | | 408/139 |
| 2013/0071195 | A1 | * | 3/2013 | Schevers | B23B 49/00 |
| | | | | | 29/407.08 |
| 2022/0219249 | A1 | * | 7/2022 | Gisselman | B23B 49/00 |

FOREIGN PATENT DOCUMENTS

| DE | 202013004642 | U1 | * | 7/2013 | B23B 49/00 |
| EP | 2 744 616 | B1 | | 1/2018 | |
| EP | 4112231 | A1 | * | 1/2023 | B23B 49/00 |

OTHER PUBLICATIONS

DE-102011080374-A1 Machine Translation (Year: 2013).*
DE-202013004642-U1 Machine Translation (Year: 2013).*
EP-4112231-A1 Machine Translation (Year: 2023).*

* cited by examiner

DOWNFORCE INDICATOR DEVICE HAVING A TOOL RECEPTACLE

This application claims priority under 35 U.S.C. § 119 to application no. DE 10 2023 207 076.6, filed on Jul. 25, 2023 in Germany, the disclosure of which is incorporated herein by reference in its entirety.

The present disclosure relates to a downforce indicator device for indicating a downforce acting on an insertion tool.

BACKGROUND

From the prior art, indicator devices in the form of drilling depth indicator devices are known that indicate a respective current drilling depth of a drilling tool during a drilling operation to a user of a hand-held power tool.

SUMMARY

The disclosure relates to a downforce indicator device for indicating a downforce acting on an insertion tool, having a tool receptacle for receiving an insertion tool at least in regions, a downforce measurement unit for measuring a downforce acting on the tool receptacle, and a downforce indicator unit for indicating the measured downforce. The downforce measuring unit comprises a first sleeve and a second sleeve disposed coaxially and axially displaceably on the first sleeve, wherein the first sleeve is connected to the second sleeve via a limit element which can be displaced axially on the first sleeve in order to establish a maximum position of the second sleeve for an axial displacement of the second sleeve directed away from the first sleeve, wherein the first sleeve and the second sleeve form a common receptacle for receiving a spring element acting on the second sleeve in the direction towards the maximum position, and wherein the maximum position is associated with a minimum downforce.

The disclosure thus allows the provision of a downforce indicator device which can safely and reliably measure a downforce acting on an insertion tool and display said downforce to a user in real time, so that the insertion tool can be preserved and thereby a higher service life can be enabled.

Preferably, the first sleeve has an interface for disposing on a machine tool receptacle of a hand-held power tool.

Thus, the downforce indicator device can be easily and straightforwardly disposed on a hand-held power tool.

Preferably, the second sleeve forms the tool receptacle.

Thus a suitable tool receptacle can be formed in a simple manner.

According to one embodiment, the tool receptacle forms a polygonal interior receptacle, in particular a HEX receptacle, for receiving an insertion tool at least in regions.

Thus, an insertion tool having a HEX receptacle can be stably and reliably received in the tool receptacle.

Preferably, the first sleeve comprises a first annular receptacle and the second sleeve comprises a second annular receptacle, wherein the first and second annular receptacle together form the receptacle for receiving the spring element.

Thus, a secure and robust accommodation of the spring element can be enabled.

The limiting element preferably comprises a screw having a screw head.

This makes it easy to provide a suitable limiting element.

According to one embodiment, the first sleeve comprises a bottom surface facing toward the second sleeve and having a recess for the screw, and the second sleeve comprises a screw thread for forming a screw connection with the screw, wherein the screw head abuts the bottom surface in the maximum position of the second sleeve and is spaced apart from the bottom surface in dependence on a downforce present along a longitudinal extension of the screw.

Thus, safe and reliable travel of the two sleeves along the longitudinal extension can be enabled.

Preferably, the second sleeve comprises an interior receptacle configured as a polygon, and the first sleeve comprises an outer perimeter associated with the interior receptacle.

Thus, torque transmission from a hand-held power tool to a downforce indicative device connected thereto can be safely and reliably facilitated.

The second sleeve preferably comprises an internal receptacle for receiving the first sleeve, wherein the first sleeve can be inserted into the second sleeve in dependence on a respective downforce, and wherein the downforce indicator unit is disposed on an outer perimeter of the first sleeve.

This allows for a suitable arrangement of the two sleeves relative to each other in a simple manner.

Preferably, the downforce indicator unit is configured as a scale disposed on the outer perimeter and/or comprises at least two color-coded indicator regions.

Thus, a respective measured downforce can be safely and reliably visualized for a user.

BRIEF DESCRIPTION OF THE DRAWINGS

The disclosure is explained in more detail in the following description with reference to the embodiment examples shown in the drawings. Shown are.

DETAILED DESCRIPTION

Figure 1:
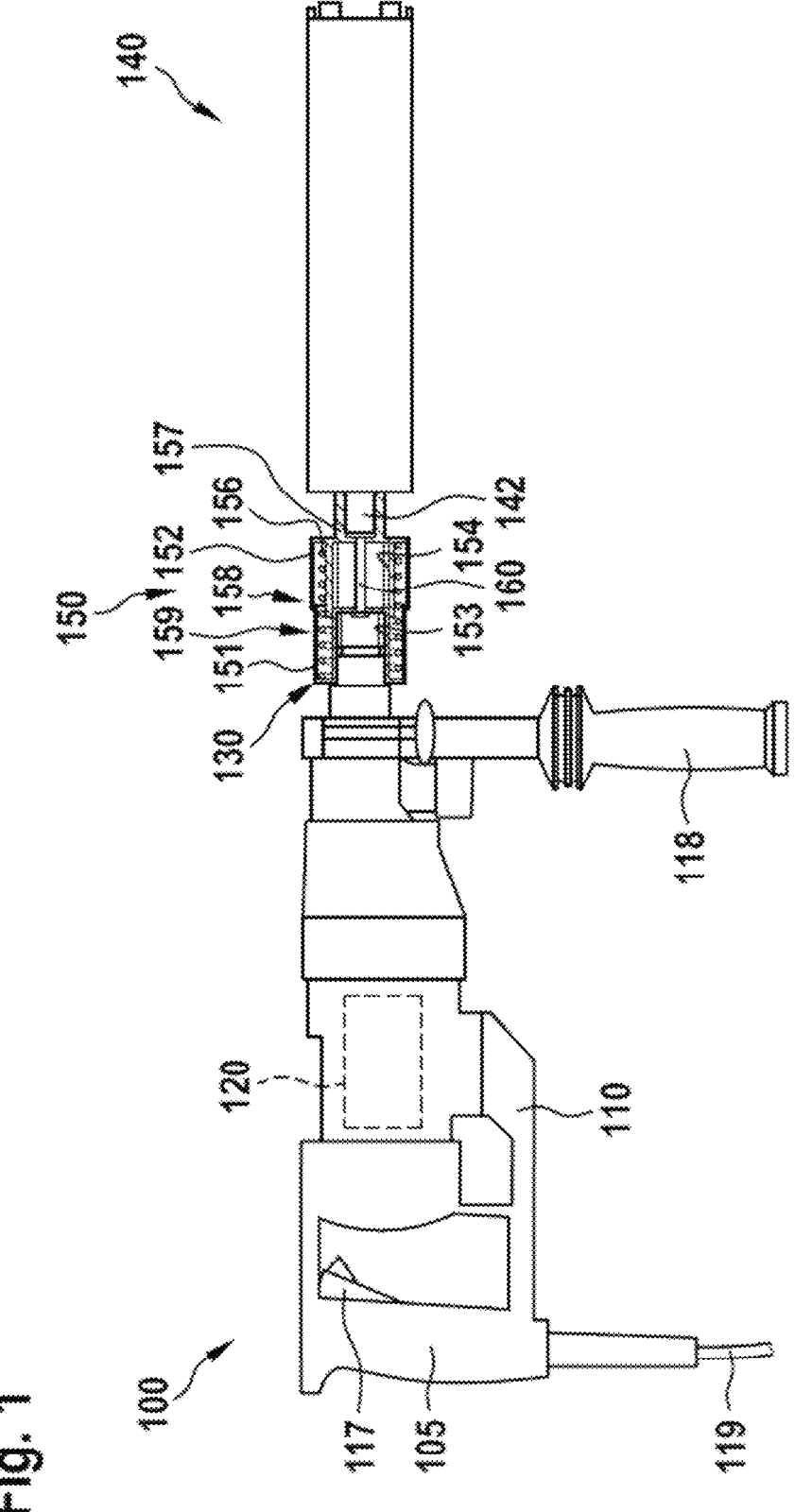
FIG. 1 a downforce indicator device according to the disclosure disposed between a hand-held power tool and an insertion tool, FIG. 2 a longitudinal section through the downforce indicator device of FIG. 1, FIG. 3 a cross-sectional perspective view through the downforce indicator device of FIG. 1 and FIG. 2, and FIG. 4 a perspective view of the downforce indicator device of FIG. 1 through FIG. 3.

Elements having the same or a comparable function are provided with the same reference numbers in the drawings and are described in detail only once.

FIG. 1 shows an exemplary hand-held power tool 100, which illustratively comprises a housing 110 having a handle 105. The hand-held power tool 100 is associated with a machine tool receptacle 130 for receiving an insertion tool 140, e.g. a drill. Illustratively, the insertion tool 140 is configured as a diamond drill crown.

Preferably, an electric drive motor 120 is disposed in the housing 110 for driving the machine tool receptacle 130. The drive unit motor 120 can preferably be switched on and off via a manual switch 117. The manual switch 117 is preferably disposed on the handle 105.

Illustratively, the hand-held power tool 100 is associated with an optional add-on handle 118. The add-on handle 118 is disposed, as an example, in the region of the machine tool receptacle 130.

Preferably, the hand-held power tool 100 comprises a power cable 119 for supplying power from the grid. However, the hand-held power tool 100 can also comprise a rechargeable battery pack for supplying power independently of the grid. Illustratively, the hand-held power tool 100 is designed as a drill, but can alternatively also be designed, for example, as a screwdriver.

Illustratively, a downforce indicator device 150 for indicating a downforce (299 in FIG. 2) acting on an insertion tool 140 is disposed on the machine tool receptacle 130. The downforce indicator device 150 comprises a tool receptacle 157 for at least partially receiving the insertion tool 140. Preferably, a receiving shaft 142 of the insertion tool 140 is disposed in the tool receptacle 157.

The insertion tool 140 may be, for example, a drilling tool. Illustratively, the insertion tool 140 is configured as a diamond drill crown.

The tool receptacle 157 and the machine tool receptacle 130 are preferably coupled to each other such that, when operating the hand-held power tool 100, a torque is transferred from the machine tool receptacle 130 to the tool receptacle 157 and thus from the same to the insertion tool 140. The coupling between the tool receptacle 157 and the machine tool receptacle 130 can be releasable. In this case, the downforce indicator device 150 is designed as an additional, particularly retrofittable part or adapter.

Figure 2:
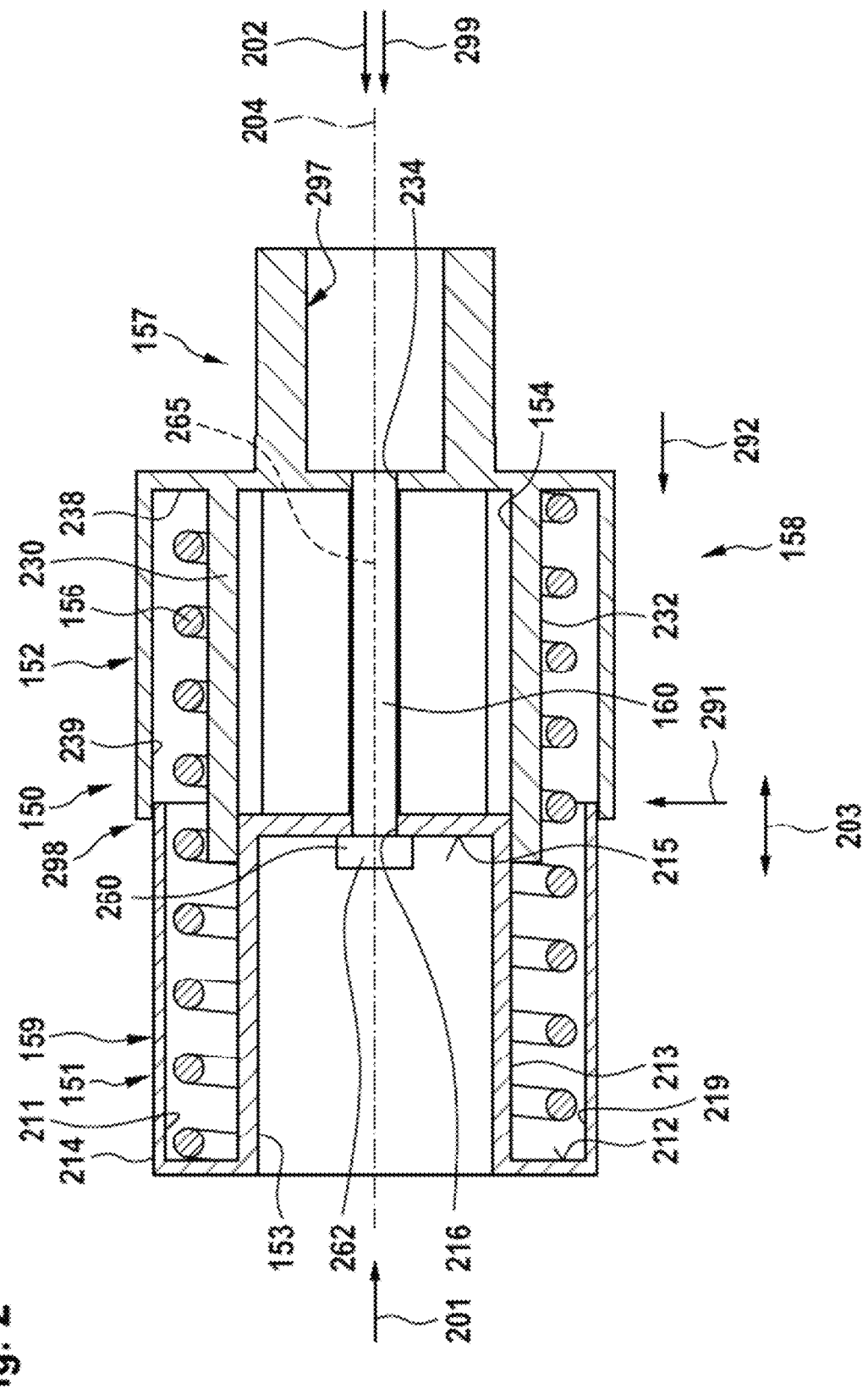

Preferably, the downforce indicator device 150 comprises a downforce measurement unit 158 for measuring a downforce (299 in FIG. 2) acting on the tool receptacle 157, and a downforce indicator unit 159 for indicating the measured downforce (299 in FIG. 2). Preferably, the downforce measuring unit 158 comprises a first sleeve 151 and a second sleeve 152. Here, the first sleeve 151 is connected to the second sleeve 152 by means of a limiting element 160 axially displaceable on the first sleeve 151, in order to establish a maximum position (298 in FIG. 2) of the second sleeve 152 for an axial displacement of the second sleeve 152 directed away from the first sleeve 151.

Preferably, the first sleeve 151 comprises an interface 153 for disposing on the machine tool receptacle 130 of the hand-held power tool 100. Furthermore, the second sleeve 152 preferably forms the tool receptacle 157. Preferably, the second sleeve 152 is disposed coaxially and displaceably in the axial direction (203 in FIG. 2) on the first sleeve 151. The first sleeve 151 and the second sleeve 152 preferably form a common receptacle (219 in FIG. 2) for receiving a spring element 156. Furthermore, the second sleeve 152 preferably comprises an interior receptacle 154 formed as a polygon.

FIG. 2 shows the downforce indicator device 150 of FIG. 1 and illustrates the construction and arrangement of the first and second sleeves 151, 152. At a first, illustrative left axial end 201 of the downforce indicator device 150, the first sleeve 151 is disposed having the interface 153 for disposing on the machine tool receptacle 130 of the hand-held power tool 100 of FIG. 1. The tool receptacle 157 for receiving the insertion tool 140 of FIG. 1 is disposed at an opposite, second, illustratively right axial end 202 of the downforce indicator device 150. Furthermore, the downforce indicator device 150 illustratively comprises a longitudinal axis 204. An axial direction 203 of the downforce indicator device 150 extends illustratively along the longitudinal axis 204.

Preferably, the second sleeve 152 is disposed coaxially and displaceably in the axial direction 203 on the first sleeve 151. The first sleeve 151 and the second sleeve 152 preferably form a common receptacle 219 for receiving the spring element 156. Preferably, the first sleeve 151 comprises a first annular receptacle 211 and the second sleeve 152 comprises a second annular receptacle 239. The first and second annular receptacles 211, 239 together form the receptacle 219 for receiving the spring element 156. Preferably, the spring member 156 is disposed in the axial direction 203 between a bottom surface 212 of the first sleeve 151 associated with the receptacle 211 and a bottom surface 238 of the second sleeve 152 associated with the receptacle 239.

The second sleeve 152 comprises an exemplary ring land 230 forming the second annular receptacle 239. The receptacle 239 is illustratively formed between the ring land 230 and an outer perimeter of the second sleeve 152. Furthermore, an interior receptacle 154 is disposed perpendicular to the longitudinal axis 204 within the ring land 230, for example. Preferably, the interior receptacle 154 is formed as a polygon. furthermore, the first sleeve 151 has an outer perimeter 213 associated with the interior receptacle 154.

Preferably, the spring element 156 is disposed on an outer perimeter 232 of the ring web 230. The spring element 156 is preferably configured to act on the second sleeve 152 in the direction towards a maximum position 298. Preferably, the maximum position 298 is associated with a minimum downforce. An exemplary minimum downforce acting at the second end 202 of the downforce indicator device 150 is illustrated with an arrow 299.

Preferably, the second sleeve 152 comprises an interior receptacle 239 for receiving the first sleeve 151, wherein the first sleeve can be inserted into the second sleeve 152 in dependence on a downforce present in each case. An outer perimeter 214 of the first sleeve 151 can be disposed in the inner receptacle 239. It is noted that, alternatively, the first sleeve 151 can also receive the second sleeve 152. In this case, the first sleeve 151 is associated with an interior receptacle in which the second sleeve 152 can be disposed.

According to one embodiment, the limiting element 160 comprises a screw 260 having a screw head 262. A longitudinal extension 265 of the screw 260 is preferably aligned in the axial direction 203.

The first sleeve 151 has a bottom surface 215 facing the second sleeve 152 and having a recess 216 for the screw 260. Furthermore, the second sleeve 152 comprises a screw thread 234 for forming a screw connection to the screw 260. Here, the screw head 262 abuts the bottom surface 215 in the maximum position of the second sleeve 152 and, depending on a downforce 299 present along the longitudinal extension 265 of the screw 260, the screw head 262 is spaced apart from the bottom surface 215. It is noted that several screws 260 can also be used. Furthermore, it is noted that screws 260 can alternatively or optionally be disposed in the receptacle 219. Furthermore, the spring element 156 can alternatively or optionally be centrally disposed, i.e., in the interior receptacle 154.

Preferably, the tool receptacle 157 forms a polygonal interior receptacle 297, in particular a HEX receptacle, for receiving the insertion tool 140 of FIG. 1 at least in regions. Furthermore, the downforce indicator unit 159 is disposed on the outer perimeter 214 of the first sleeve 151. Furthermore, FIG. 2 illustrates an axial position 291 along the longitudinal axis 204, as well as an arrow 292 illustrating a direction of view.

Figures 3, 4:
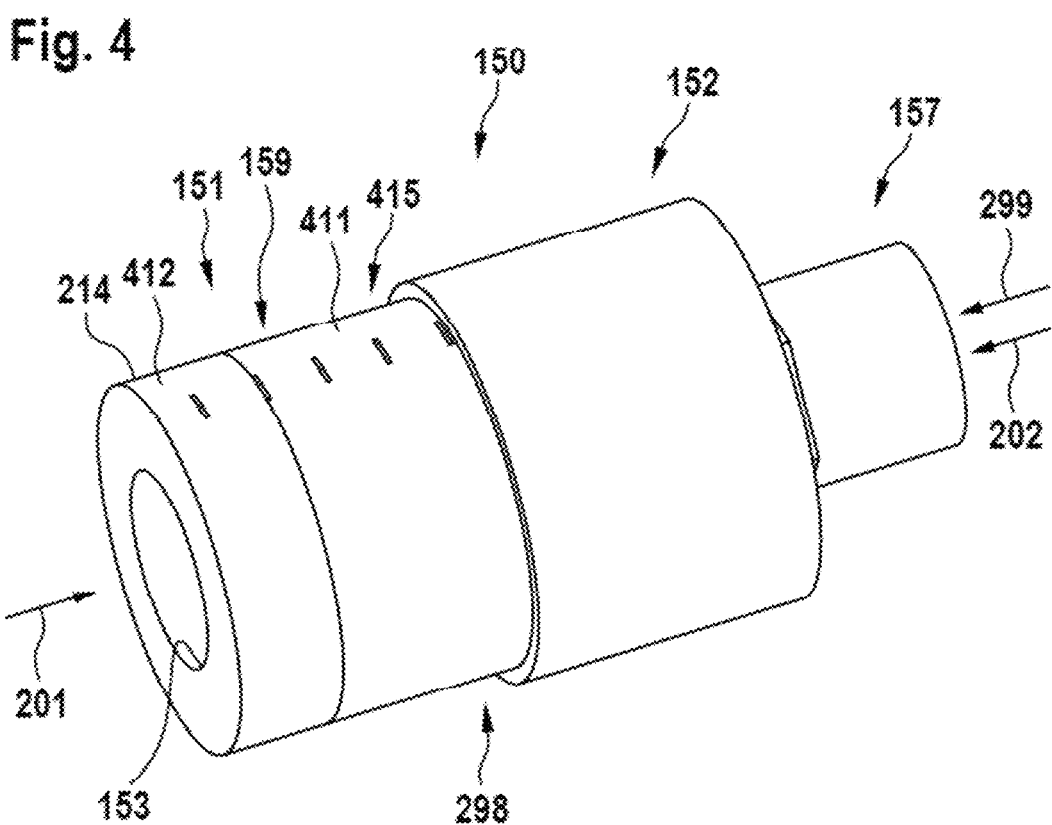

FIG. 3 shows the downforce indicator device 150 of FIG. 1 and FIG. 2 having the first sleeve 151 and the second sleeve 152, wherein the downforce indicator device 150 is illustratively sectioned at the axial position 291 of FIG. 2 and viewed in the direction of the arrow 292 of FIG. 2. FIG. 3 illustrates the arrangement of the first and second sleeves 151, 152 coaxially to each other or one inside the other. Here, the spring element 156 of FIG. 2 is disposed in the receptacle 219 or in the radial direction between the first and second sleeves 151, 152. Furthermore, FIG. 3 illustrates the second sleeve 152 having the interior receptacle 154 thereof configured as a polygon, as well as the associated outer perimeter 213 of the first sleeve 151.

FIG. 4 shows the downforce indicator device 150 of FIG. 1 through FIG. 3 having the first and second sleeves 151, 152. In so doing, FIG. 4 illustrates the downforce indicator unit 159.

According to one embodiment, the downforce indicator unit 159 is configured as a scale 415 disposed on the outer perimeter 214 of the first sleeve 151. Alternatively or optionally, the downforce indicator unit 159 comprises at least two color-coded indicator regions 411, 412. Here, the indicator region 411 can visualize an optimal downforce and the indicator region 412 visualizes an excessively high downforce, at which the insertion tool 140 of FIG. 1 is stressed too much.

For example, the indicator region 411 can be marked green and the indicator region 412 can be marked red. It is noted that the indicator regions 411, 412 can also be of any other color.

What is claimed is:

1. A downforce indicator device for indicating a downforce acting on an insertion tool, comprising:

a tool receptacle configured to receive an insertion tool at least in regions;

a downforce measurement unit configured to measure a downforce acting on the tool receptacle; and a downforce indicator unit configured to indicate the measured downforce, wherein the downforce measurement unit comprises a first sleeve and a second sleeve coaxially and axially displaceably disposed on the first sleeve, the first sleeve is connected to the second sleeve by a limiting element configured to be displaced axially on the first sleeve to establish a maximum position of the second sleeve for an axial displacement of the second sleeve directed away from the first sleeve, the first sleeve and the second sleeve form a common receptacle configured to receive a spring element configured to act on the second sleeve in a direction toward the maximum position, the maximum position is associated with a minimum downforce acting on the tool receptacle, and the limiting element comprises a screw having a screw head at least partially within the second sleeve.

2. The downforce indicator device according to claim 1, wherein the first sleeve has an interface configured to be disposed on a machine tool receptacle of a hand-held power tool.

3. The downforce indicator device according to claim 1, wherein:

the first sleeve comprises a first annular receptacle;

the second sleeve comprises a second annular receptacle; and the first and second annular receptacle together form the common receptacle configured to receive the spring element.

4. The downforce indicator device according to claim 1, wherein:

the first sleeve comprises a bottom including a first surface facing toward the tool receptacle, and having a recess for the screw;

the second sleeve comprises a screw thread for forming a screw connection to the screw; and the screw head abuts a second surface of the bottom opposite the first surface in the maximum position of the second sleeve and is spaced apart from the second surface in dependence on a respective downforce along a longitudinal extension of the screw.

5. The downforce indicator device according to claim 1, wherein:

the second sleeve comprises an interior receptacle formed as a polygon; and the first sleeve comprises an exterior perimeter associated with the interior receptacle.

6. The downforce indicator device according to claim 1, wherein:

the downforce indicator device includes only one limiting element.

7. The downforce indicator device according to claim 1 wherein the second sleeve forms the tool receptacle.

8. The downforce indicator device according to claim 7, wherein the tool receptacle forms a HEX receptacle configured to receive the insertion tool at least in regions.

9. The downforce indicator device according to claim 1, wherein:

the second sleeve comprises an internal receptacle configured to receive the first sleeve;

the first sleeve is configured to be inserted into the second sleeve as a function of the downforce; and the downforce indicator unit is disposed on an outer perimeter of the first sleeve.

10. The downforce indicator device according to claim 9, wherein the downforce indicator unit is formed as a scale disposed on the outer perimeter and/or comprises at least two color-coded indicator regions.

11. A downforce indicator device for indicating a downforce acting on an insertion tool, comprising:

a tool receptacle configured to receive an insertion tool at least in regions;

a downforce measurement unit configured to measure a downforce acting on the tool receptacle; and a downforce indicator unit configured to indicate the measured downforce, wherein the downforce measurement unit comprises a first sleeve and a second sleeve coaxially and axially displaceably disposed on the first sleeve, the first sleeve is connected to the second sleeve by a limiting element configured to be displaced axially on the first sleeve to establish a maximum position of the second sleeve for an axial displacement of the second sleeve directed away from the first sleeve, the first sleeve and the second sleeve form a common receptacle configured to receive a spring element configured to act on the second sleeve in a direction toward the maximum position, and the maximum position is associated with a minimum downforce acting on the tool receptacle, wherein the limiting element comprises a screw having a screw head.

12. The downforce indicator device according to claim 11, wherein:

the first sleeve comprises a bottom with a first surface facing toward the tool receptacle, and having a recess for the screw;

the second sleeve comprises a screw thread for forming a screw connection to the screw; and the screw head abuts a second surface of the bottom opposite the first surface in the maximum position of the second sleeve and is spaced apart from the second surface in dependence on a respective downforce along a longitudinal extension of the screw.

* * * * *